United States Patent [19]

Jäger et al.

[11] 4,446,067
[45] May 1, 1984

[54] AZO REACTIVE DYESTUFFS

[75] Inventors: Horst Jäger; Klaus Wunderlich, both of Leverkusen, Fed. Rep. of Germany

[73] Assignee: Bayer Aktiengesellschaft, Leverkusen, Fed. Rep. of Germany

[21] Appl. No.: 202,230

[22] Filed: Oct. 30, 1980

Related U.S. Application Data

[63] Continuation of Ser. No. 64,939, Aug. 8, 1979.

[30] Foreign Application Priority Data

Sep. 1, 1978 [DE] Fed. Rep. of Germany ....... 2838271

[51] Int. Cl.³ .................................................. C09B 29/00
[52] U.S. Cl. .................................................. 260/153
[58] Field of Search ........................................ 260/153

[56] References Cited

U.S. PATENT DOCUMENTS

| | | | |
|---|---|---|---|
| 3,627,749 | 12/1971 | Ackermann et al. | 260/153 |
| 3,758,470 | 9/1973 | Ackermann et al. | 260/153 X |
| 4,115,378 | 9/1978 | Bien et al. | 260/153 X |
| 4,284,554 | 8/1981 | Doswald | 260/153 |
| 4,294,580 | 10/1981 | Henk et al. | 260/153 X |

Primary Examiner—Paul F. Shaver

Attorney, Agent, or Firm—Sprung, Horn, Kramer & Woods

[57] ABSTRACT

Dyestuffs of the formula

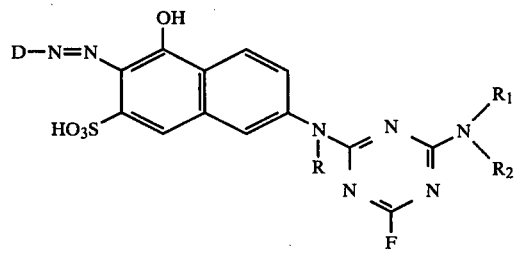

wherein
D, R, $R_1$ and $R_2$ have the meaning indicated in the description, and their use for dyeing and printing materials containing hydroxyl groups or amide groups, such as textile fibres, filaments and fabrics of wool, silk or synthetic polyamide or polyurethane fibres, and for dyeing and printing natural or regenerated cellulose with dyeings and prints which are fast to washing.

8 Claims, No Drawings

AZO REACTIVE DYESTUFFS

This is a continuation of application Ser. No. 64,939, filed Aug. 8, 1979 now pending.

The present invention relates to fibre-reactive azo dyestuffs of the formula

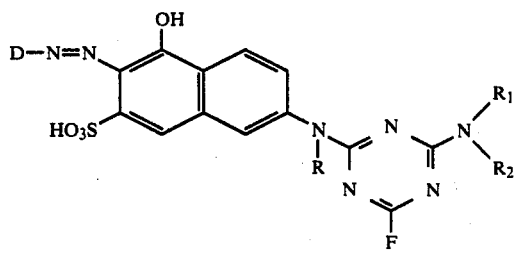
(I)

wherein

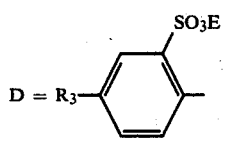

wherein $R_3$ represents halogen, such as fluorine, chlorine or bromine, $C_1$–$C_4$-alkyl, $C_1$–$C_4$-alkoxy or a sulpho, carboxyl, acylamino or 4-sulphophenylazo group, or wherein

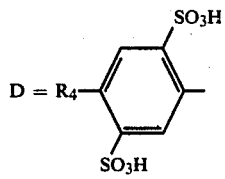

wherein $R_4$ represents hydrogen, methyl, ethyl or acylamino, or wherein

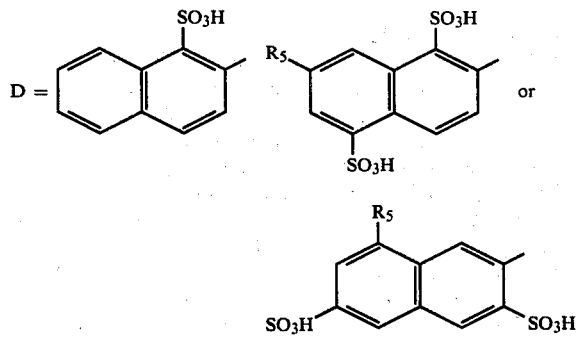

wherein $R_5$ represents hydrogen or a sulpho group, and wherein

R=hydrogen or $C_1$–$C_4$-alkyl and $R_1$ and $R_2$=hydrogen, optionally substituted alkyl or cycloalkyl or $R_1$ and $R_2$ form a ring with the nitrogen atom, optionally including a further hetero-atom.

The following compounds are examples of amines of the formula $D-NH_2$ on which the dyestuffs are based: 1-amino-2,4-disulpho-benzene, 1-amino-2-sulpho-4-methyl-benzene, 1-amino-2-sulpho-4-ethyl-benzene, 1-amino-2-sulpho-4-methoxy-benzene, 1-amino-2-sulpho-4-ethoxy-benzene, 1-amino-2-sulpho-4-propoxy-benzene, 1-amino-2-sulpho-4-iso-propoxy-benzene, 1-amino-2-sulpho-4-chloro-benzene, 1-amino-2,5-disulpho-benzene, 2-amino-1-sulpho-naphthalene, 2-amino-1,5-disulpho-naphthalene, 2-amino-1,5,7-trisulpho-naphthalene, 2-amino-3,6-disulpho-naphthalene, 2-amino-3,6,8-trisulpho-naphthalene, 1-amino-2-sulpho-4-carboxy-benzene, 1-amino-2-sulpho-4-acetylamino-benzene, 1-amino-2-sulpho-4-(4'-sulphophenylazo)-benzene, 1-amino-2,5-disulpho-4-methyl-benzene and 1-amino-2,5-disulpho-4-acetylamino-benzene.

Examples of suitable optionally substituted alkyl radicals $R_1$ and $R_2$ are: methyl, ethyl, n-propyl, iso-propyl, n-butyl, iso-butyl, t-butyl, n-pentyl, n-hexyl, β-hydroxyethyl, β-methoxyethyl, β-ethoxyethyl, carboxymethyl, β-sulphoethyl, phenylmethyl, β-phenylethyl and cyclohexyl.

Alkyl radicals $R_1$ and $R_2$ are preferably $C_1$–$C_4$-alkyl.

The following radicals are examples of cyclic radicals of the formula

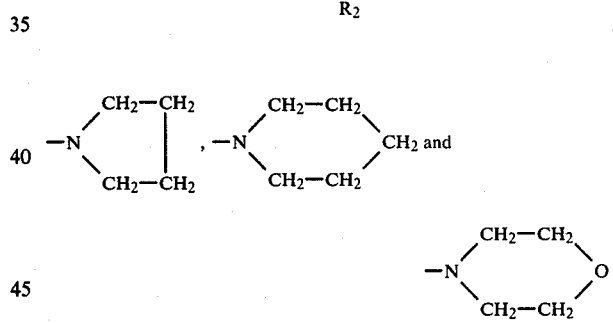

Preferred compounds are those of the formula

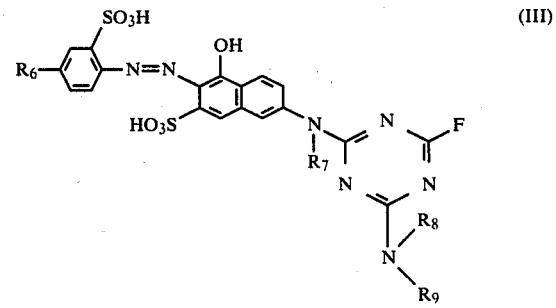
(III)

wherein $R_6$=methyl, chlorine, acetylamino, sulpho, carboxyl, methoxy, ethoxy or 4-sulphophenylazo, $R_7$=hydrogen or methyl, $R_8$=hydrogen or $C_1$–$C_4$-alkyl and $R_9$=hydrogen or $C_1$–$C_4$-alkyl, and those of the formula

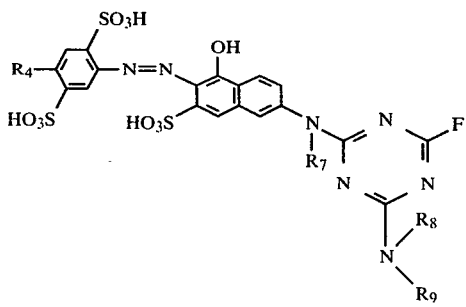

wherein $R_4$=hydrogen, methyl, ethyl or acetylamino,
$R_7$=hydrogen or methyl,
$R_8$=hydrogen or $C_1$-$C_4$-alkyl and
$R_9$=hydrogen or $C_1$-$C_4$-alkyl.

Particularly preferred dyestuffs are those of the formulae (III) and (IV) in which $R_7$, $R_8$ and $R_9$ represent hydrogen, and those of the formula

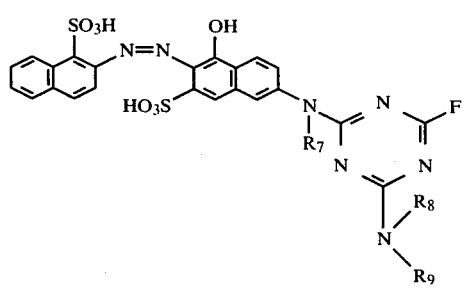

wherein $R_7$=hydrogen or methyl,
$R_8$=hydrogen or $C_1$-$C_4$-alkyl and
$R_9$=hydrogen or $C_1$-$C_4$-alkyl, and those of the formula

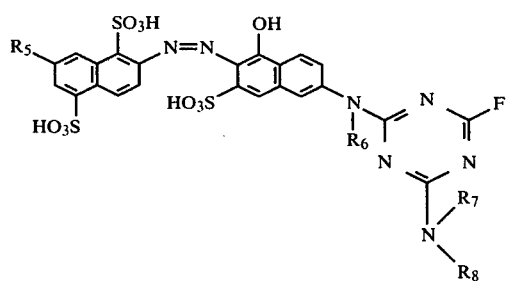

wherein $R_5$ has the meaning indicated above,
$R_7$=hydrogen or methyl,
$R_8$=hydrogen or $C_1$-$C_4$-alkyl and
$R_9$=hydrogen or $C_1$-$C_4$-alkyl,
and those of the formula

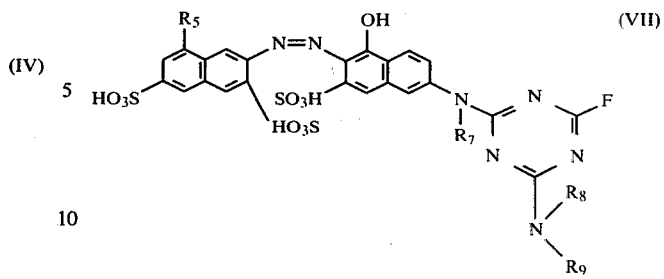

wherein $R_5$ has the meaning indicated above,
$R_7$=hydrogen or methyl,
$R_8$=hydrogen or $C_1$-$C_4$-alkyl and
$R_9$=hydrogen or $C_1$-$C_4$-alkyl.

Particularly preferred compounds are those of the formulae (V) to (VII) in which $R_8$ and $R_9$=hydrogen.

The invention furthermore relates to a process for the preparation of the compounds of the formula (I). In this process, dyestuffs of the formula

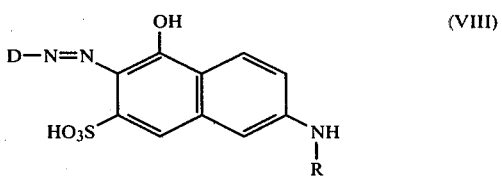

wherein

D and R have the meaning indicated above, are subjected to condensation reactions with 2,4,6-trifluoro-1,3,5-triazine, hydrofluoric acid being split off, and the resulting difluoro compounds are reacted with amines of the formula

hydrofluoric acid being split off, to give the compounds (I).

The condensation of the dyestuffs (VIII) with s-trifluorotriazine is preferably carried out in aqueous solution or suspension, at low temperature and at a weakly acid, neutral to weakly alkaline pH value.

The condensation reaction is advantageously carried out in the pH range from 3 to 5. The hydrogen fluoride liberated is buffered by adding aqueous alkali metal hydroxides, carbonates or bicarbonates. The reaction of the difluoro compound with the amines (IX) is likewise preferably carried out in aqueous solution or suspension, at low temperature and at a neutral to weakly alkaline pH value. The hydrogen fluoride liberated during the reaction is neutralised by adding aqueous alkali metal hydroxides, carbonates or bicarbonates. The neutralisation can advantageously also be effected with a second equivalent of amine (IX), in particular with ammonia. Isolation of the difluoro compound is generally omitted.

The dyestuffs (VIII) are obtained by coupling diazotised amines (II) with I-acid under conditions such that coupling is preferably effected in the o-position relative to the hydroxy group of I-acid. However, coupling with a N-acylated I-acid is generally preferred, the acyl radical then being split off by warming the product in an acid or alkaline medium. Possible acyl radicals are, in particular, acetyl, carbamoyl, methoxycarbonyl, ethoxycarbonyl or NH₂—CO— (I-acid urea, obtained by reaction with phosgene).

The following compounds are examples of amines (IX): ammonia, methylamine, ethylamine, n-propylamine, iso-propylamine, n-butylamine, iso-butylamine, t-butylamine, n-pentylamine, n-hexylamine, cyclohexylamine, dimethylamine, diethylamine, di-n-propylamine, di-iso-propylamine, methylethylamine, ethanolamine, diethanolamine, β-methoxyethylamine, β-ethoxyethylamine, aminoacetic acid, N-methylaminoacetic acid, taurine, N-methyltaurine, benzylamine, β-phenylethylamine, N-methylbenzylamine, pyrrolidine, piperidine and morpholine.

In a further process for the preparation of compounds (I), dyestuffs (VIII) are reacted with the corresponding aminodifluorotriazines, advantageously in an aqueous medium at weakly acid to neutral pH values. It is also possible to first prepare the coupling components of the formula

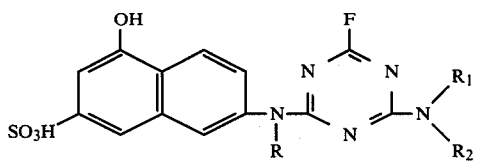

and to couple these with diazotised amines D—NH₂ in a customary manner, to give compounds (I).

The invention furthermore relates to dyestuffs of the formula

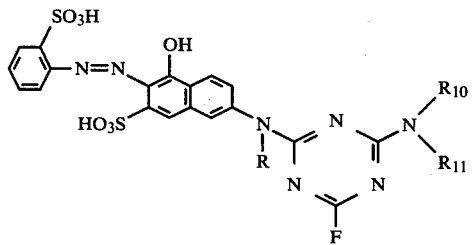

wherein
R has the meaning indicated above and
$R_{10}$ and $R_{11}$=hydrogen or optionally substituted $C_2$-$C_4$-alkyl, or
$R_{10}$ and $R_{11}$ form a ring with the nitrogen atom, optionally including a further hetero-atom.

The new dyestuffs are suitable for dyeing and printing materials containing hydroxyl groups or amide groups, such as textile fibres, filaments and fabrics of wool, silk or synthetic polyamide or polyurethane fibres and for dyeing and printing natural or regenerated cellulose with dyeings and prints which are fast to washing, the treatment of cellulose materials appropriately being carried out by processes disclosed for reactive dyestuffs, in the presence of acid-binding agents and if necessary by the action of heat.

The formulae indicated for the dyestuffs are those of the corresponding free acids. The dyestuffs were generally isolated, and employed for dyeing, in the form of alkali metal salts, in particular Na salts.

EXAMPLE 1

45.3 g of the dyestuff 2-sulpho-4-methoxy-benzene <1 azo 2> 1-hydroxy-3-sulpho-6-amino-naphthalene are stirred in a mixture of 400 ml of water and 300 g of ice. 13.5 g of 5-trifluorotriazine are added dropwise, during which the hydrofluoric acid liberated is buffered by adding a 20% strength sodium carbonate solution at a rate such that a pH value of 3.5–4.5 is maintained. The mixture is subsequently stirred for some minutes, and complete acylation is confirmed by a diazotisation test.

EXAMPLE 1A

The pH of the clear solution obtained is then adjusted to 9 with 12% strength ammonia solution, and ammonia is subsequently added dropwise at 0°–5° until no further change in pH takes place. In order to separate out the dyestuff, 10% by volume of sodium chloride is added to the clear solution. After filtering off, drying and grinding the product, a red dyestuff powder which is readily soluble in water is obtained. The dyestuff corresponds to the formula

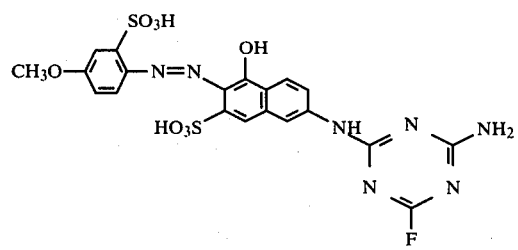

EXAMPLE 1B

The pH of the clear dyestuff solution obtained is adjusted to 9 by adding 9.9 g of cyclohexylamine dropwise. Dilute sodium hydroxide solution is then added so that the pH is kept at 9. The temperature during the 2nd condensation stage is 0°–10°. The condensation reaction has ended when no further sodium hydroxide solution is consumed. The dyestuff is salted out, filtered off and dried. After grinding, a red dyestuff powder which dissolves in water giving a yellowish-tinged red-coloured solution is obtained. The dyestuff corresponds to the formula

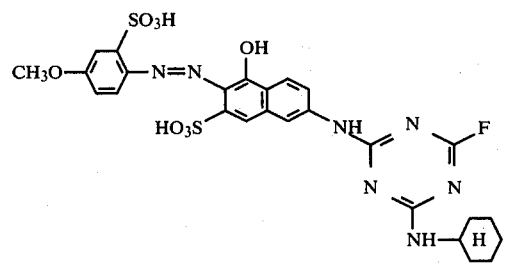

The dyestuff used as the starting material is obtained by diazotising 1-amino-2-sulpho-4-methoxy-benzene, coupling the diazotisation product with N-acetyl-I-acid in a weakly acid to neutral pH range, subsequently saponifying the acetyl group with dilute sodium hydroxide solution at 80°–90°, and isolating the product by salting out in a weakly alkaline range.

Dyeing examples

Printing instructions

If cotton nettle is printed with a printing paste which contains, per kilogram, 20 g of the dyestuff prepared according to Example 1A, 100 g of urea, 300 ml of water, 500 g of alginate thickener (60 g of sodium alginate/kg of thickener) and 10 g of sodium carbonate and which has been made up to 1 kg with water, and the cotton nettle is dried, steamed at 103° C. for 1 minute, rinsed with hot water and soaped at the boil, a clear, yellowish-tinged red print of good fastness to wet processing and light is obtained.

Padding instructions 30 parts of the dyestuff prepared according to Example 1A are dissolved in 1,000 parts of water. A cotton fabric is padded with this solution and pressed off to a weight increase of 90%. The still moist cotton is treated for 30 minutes at 70° in a bath which contains 300 parts of calcined sodium sulphate and 10 parts of calcined sodium carbonate dissolved in 1,000 parts of water. The dyeing is then finished in the customary manner. A brilliant scarlet dyeing with outstanding fastness to wet processing and light is obtained.

Dyeing instructions 168 ml of water of 20°-25° are initially introduced into a dyeing beaker which has a capacity of 300 ml and is in a waterbath which can be heated. 0.3 g of the dyestuff obtained according to Example 1A is mixed thoroughly with 2 ml of cold water to form a paste, and 30 ml of hot water (70°) are added; the dyestuff thereby dissolves. The dyestuff solution is added to the initially introduced water and 10 g of cotton yarn are kept continuously in motion in this dye liquor. The temperature of the dye liquor is increased to 40°-50° in the course of 10 minutes, 10 g of anhydrous sodium sulphate are added and dyeing is continued for 30 minutes. 4 g of anhydrous sodium carbonate are then added to the dye liquor and dyeing is carried out at 40°-50° for 60 minutes. The dyed material is then taken out of the dye liquor, the adhering liquor is removed by wringing out or pressing off and the material is rinsed first with cold water and then with hot water, until the rinsing liquor is no longer stained. The dyed material is then soaped at the boiling point for 20 minutes in 200 ml of a liquor which contains 0.2 g of a sodium alkyl-sulphate, rinsed again and dried at 60°-70° in a drying cabinet. A brilliant scarlet dyeing of good fastness to washing and light is obtained.

If the procedure followed is according to the statements of Example 1, but instead of the aminoazo dyestuff used in that example, compounds which are obtainable by diazotising the diazo components listed in column 1, coupling the diazotisation products with the acetyl compounds of the coupling components given in column 2 and saponifying the acetyl group are employed, and instead of ammonia or cyclohexylamine, one of the amines described in column 3 is used, according to variant A or B, equally valuable dyestuffs which dye cotton, by one of the dyeing processes mentioned, in one of the shades listed in column 4 result.

| Example | Column 1 | Column 2 | Column 3 | Variant | Column 4 |
| --- | --- | --- | --- | --- | --- |
| 2 | 1-amino-2-sulpho-4-methoxy-benzene | 1-hydroxy-3-sulpho-6-amino-napthalene | methylamine | A | scarlet |
| 3 | 1-amino-2-sulpho-4-methoxy-benzene | 1-hydroxy-3-sulpho-6-amino-naphthalene | ethylamine | A | " |
| 4 | 1-amino-2-sulpho-4-methoxy-benzene | 1-hydroxy-3-sulpho-6-amino-naphthalene | dimethylamine | A | " |
| 5 | 1-amino-2-sulpho-4-methoxy-benzene | 1-hydroxy-3-sulpho-6-amino-naphthalene | ethanolamine | A | " |
| 6 | 1-amino-2-sulpho-4-methoxy-benzene | 1-hydroxy-3-sulpho-6-amino-naphthalene | iso-propylamine | B | " |
| 7 | 1-amino-2-sulpho-4-methoxy-benzene | 1-hydroxy-3-sulpho-6-amino-naphthalene | n-butylamine | B | " |
| 8 | 1-amino-2-sulpho-benzene | 1-hydroxy-3-sulpho-6-amino-naphthalene | ammonia | A | yellowish-tinged orange |
| 9 | 1-amino-2-sulpho-benzene | 1-hydroxy-3-sulpho-6-amino-naphthalene | methylamine | A | yellowish-tinged orange |
| 10 | 1-amino-2-sulpho-benzene | 1-hydroxy-3-sulpho-6-amino-naphthalene | ethylamine | A | yellowish-tinged orange |
| 11 | 1-amino-2-sulpho-benzene | 1-hydroxy-3-sulpho-6-amino-naphthalene | dimethylamine | A | yellowish-tinged orange |
| 12 | 1-amino-2-sulpho-benzene | 1-hydroxy-3-sulpho-6-amino-naphthalene | ethanolamine | B | yellowish-tinged orange |
| 13 | 1-amino-2-sulpho-benzene | 1-hydroxy-3-sulpho-6-amino-naphthalene | iso-propylamine | B | yellowish-tinged orange |
| 14 | 1-amino-2-sulpho-benzene | 1-hydroxy-3-sulpho-6-amino-naphthalene | n-butylamine | B | yellowish-tinged orange |
| 15 | 1-amino-2-sulpho-4-ethoxy-benzene | 1-hydroxy-3-sulpho-6-amino-naphthalene | ammonia | A | scarlet |
| 16 | 1-amino-2-sulpho-4-ethoxy-benzene | 1-hydroxy-3-sulpho-6-amino-naphthalene | methylamine | A | " |
| 17 | 1-amino-2-sulpho-4-ethoxy-benzene | 1-hydroxy-3-sulpho-6-amino-naphthalene | ethylamine | B | " |
| 18 | 1-amino-2-sulpho-4-chloro-benzene | 1-hydroxy-3-sulpho-6-amino-naphthalene | ammonia | A | yellowish-tinged orange |
| 19 | 1-amino-2-sulpho-4-chloro-benzene | 1-hydroxy-3-sulpho-6-amino-naphthalene | methylamine | A | yellowish-tinged orange |
| 20 | 1-amino-2-sulpho-4-chloro-benzene | 1-hydroxy-3-sulpho-6-amino-naphthalene | ethanolamine | A | yellowish-tinged orange |
| 21 | 1-amino-2-sulpho-4-chloro-benzene | 1-hydroxy-3-sulpho-6-amino-naphthalene | diethylamine | B | yellowish-tinged orange |
| 22 | 1-amino-2-sulpho- | 1-hydroxy-3-sulpho- | ammonia | A | reddish-tinged |

-continued

| Example | Column 1 | Column 2 | Column 3 | Variant | Column 4 |
|---|---|---|---|---|---|
| | 4-methyl-benzene | 6-amino-naphthalene | | | orange |
| 23 | 1-amino-2-sulpho-4-methyl-benzene | 1-hydroxy-3-sulpho-6-amino-naphthalene | methylamine | A | reddish-tinged orange |
| 24 | 1-amino-2-sulpho-4-methyl-benzene | 1-hydroxy-3-sulpho-6-amino-naphthalene | aminoacetic acid | B | redish-tinged orange |
| 25 | 1-amino-2-sulpho-4-methyl-benzene | 1-hydroxy-3-sulpho-6-amino-naphthalene | taurine | B | reddish-tinged orange |
| 26 | 1-amino-2-sulpho-4-methyl-benzene | 1-hydroxy-3-sulpho-6-amino-naphthalene | N—methyltaurine | B | reddish-tinged orange |
| 27 | 1-amino-2-sulpho-4-methyl-benzene | 1-hydroxy-3-sulpho-6-amino-naphthalene | ethanolamine | B | reddish-tinged orange |
| 28 | 1-amino-2-sulpho-4-methyl-benzene | 1-hydroxy-3-sulpho-6-amino-naphthalene | diethanolamine | B | reddish-tinged orange |
| 29 | 1-amino-2,4-di-sulpho-benzene | 1-hydroxy-3-sulpho-6-amino-naphthalene | ammonia | A | yellowish-tinged orange |
| 30 | 1-amino-2,4-di-sulpho-benzene | 1-hydroxy-3-sulpho-6-amino-naphthalene | cyclohexylamine | B | yellowish-tinged orange |
| 31 | 1-amino-2,4-di-sulpho-benzene | 1-hydroxy-3-sulpho-6-amino-naphthalene | ethylamine | B | yellowish-tinged orange |
| 32 | 1-amino-2,4-di-sulpho-benzene | 1-hydroxy-3-sulpho-6-amino-naphthalene | iso-propylamine | B | yellowish-tinged orange |
| 33 | 1-amino-2,4-di-sulpho-benzene | 1-hydroxy-3-sulpho-6-amino-naphthalene | n-butylamine | B | yellowish-tinged orange |
| 34 | 1-amino-2,5-disul-pho-benzene | 1-hydroxy-3-sulpho-6-amino-naphthalene | ammonia | A | yellowish-tinged orange |
| 35 | 1-amino-2,5-disul-pho-benzene | 1-hydroxy-3-sulpho-6-amino-naphthalene | cyclohexylamine | B | yellowish-tinged orange |
| 36 | 1-amino-2,5-disul-pho-benzene | 1-hydroxy-3-sulpho-6-amino-naphthalene | ethylamine | B | yellowish-tinged orange |
| 37 | 1-amino-2,5-disul-pho-benzene | 1-hydroxy-3-sulpho-6-amino-naphthalene | iso-propylamine | B | yellowish-tinged orange |
| 38 | 1-amino-2,5-disul-pho-benzene | 1-hydroxy-3-sulpho-6-amino-naphthalene | n-butylamine | B | yellowish-tinged orange |
| 39 | 1-amino-2,5-disul-pho-benzene | 1-hydroxy-3-sulpho-6-amino-naphthalene | n-hexylamine | B | yellowish-tinged orange |
| 40 | 1-amino-2,5-disul-pho-benzene | 1-hydroxy-3-sulpho-6-amino-naphthalene | morpholine | B | yellowish-tinged orange |
| 41 | 1-amino-2,5-disul-pho-benzene | 1-hydroxy-3-sulpho-6-amino-naphthalene | cyclohexylamine | B | yellowish-tinged orange |
| 42 | 1-amino-2,5-disul-pho-benzene | 1-hydroxy-3-sulpho-6-amino-naphthalene | benzylamine | B | yellowish-tinged orange |
| 43 | 1-amino-2,5-disulpho-benzene | 1-hydroxy-3-sulpho-6-amino-naphthalene | β-phenylethylamine | B | yellowish-tinged orange |
| 44 | 1-amino-2,5-disulpho-benzene | 1-hydroxy-3-sulpho-6-amino-naphthalene | N—methyl-benzylamine | B | yellowish-tinged orange |
| 45 | 2-amino-1-sulpho-naphthalene | 1-hydroxy-3-sulpho-6-methylamino-naphthalene | ammonia | A | deeply reddish-tinged orange |
| 46 | 2-amino-1-sulpho-naphthalene | 1-hydroxy-3-sulpho-6-methylamino-naphthalene | methylamine | A | deeply reddish-tinged orange |
| 47 | 2-amino-1-sulpho-naphthalene | 1-hydroxy-3-sulpho-6-methylamino-naphthalene | ethanolamine | A | deeply reddish-tinged orange |
| 48 | 2-amino-1-sulpho-naphthalene | 1-hydroxy-3-sulpho-6-methylamino-naphthalene | diethanolamine | B | deeply reddish-tinged orange |
| 49 | 2-amino-1-sulpho-naphthalene | 1-hydroxy-3-sulpho-6-methylamino-naphthalene | morpholine | B | deeply reddish tinge orange |
| 50 | 2-amino-1-sulpho-naphthalene | 1-hydroxy-3-sulpho-6-methylamino-naphthalene | dimethylamine | A | deeply reddish tinged orange |
| 51 | 2-amino-1-sulpho-naphthalene | 1-hydroxy-3-sulpho-6-amino-naphthalene | ammonia | A | deeply reddish-tinged orange |
| 52 | 2-amino-1-sulpho-naphthalene | 1-hydroxy-3-sulpho-6-amino-naphthalene | methylamine | A | deeply reddish-tinged orange |
| 53 | 2-amino-1-sulpho-naphthalene | 1-hydroxy-3-sulpho-6-amino-naphthalene | aminoacetic acid | B | deeply reddish-tinged orange |
| 54 | 2-amino-1-sulpho-naphthalene | 1-hydroxy-3-sulpho-6-amino-naphthalene | taurine | B | deeply reddish-tinged orange |
| 55 | 2-amino-1-sulpho-naphthalene | 1-hydroxy-3-sulpho-6-amino-naphthalene | N—methylamine | B | deeply reddish-tinged orange |
| 56 | 2-amino-1-sulpho-naphthalene | 1-hydroxy-3-sulpho-6-amino-naphthalene | ethanolamine | B | deeply reddish-tinged orange |
| 57 | 2-amino-1-sulpho-naphthalene | 1-hydroxy-3-sulpho-6-amino-naphthalene | diethanolamine | B | deeply reddish-tinged orange |
| 58 | 2-amino-1-sulpho-naphthalene | 1-hydroxy-3-sulpho-6-amino-naphthalene | β-methoxyethylamine | B | deeply reddish-tinged orange |
| 59 | 2-amino-1,5-di-sulpho-naphthalene | 1-hydroxy-3-sulpho-6-methylamino- | ammonia | A | reddish-tinged orange |

-continued

| Example | Column 1 | Column 2 | Column 3 | Variant | Column 4 |
|---|---|---|---|---|---|
| 60 | 2-amino-1,5-di-sulpho-naphthalene | 1-hydroxy-3-sulpho-6-methylamino-naphthalene | methylamine | A | reddish-tinged orange |
| 61 | 2-amino-1,5-di-sulpho-naphthalene | 1-hydroxy-3-sulpho-6-methylamino-naphthalene | ethylamine | A | reddish-tinged orange |
| 62 | 2-amino-1,5-di-sulpho-naphthalene | 1-hydroxy-3-sulpho-6-methylamino-naphthalene | ethanolamine | A | reddish-tinged orange |
| 63 | 2-amino-1,5-di-sulpho-naphthalene | 1-hydroxy-3-sulpho-6-methylamino-naphthalene | cyclohexylamine | B | reddish-tinged orange |
| 64 | 2-amino-1,5-di-sulpho-naphthalene | 1-hydroxy-3-sulpho-6-methylamino-naphthalene | morpholine | B | reddish-tinged orange |
| 65 | 2-amino-1,5-di-sulpho-naphthalene | 1-hydroxy-3-sulpho-6-methylamino-naphthalene | n-propylamine | B | reddish-tinged orange |
| 66 | 2-amino-1,5-di-sulpho-naphthalene | 1-hydroxy-3-sulpho-6-methylamino-naphthalene | iso-propylamine | B | reddish-tinged orange |
| 67 | 2-amino-1,5-di-sulpho-naphthalene | 1-hydroxy-3-sulpho-6-amino-naphthalene | ammonia | A | reddish-tinged orange |
| 68 | 2-amino-1,5-di-sulpho-naphthalene | 1-hydroxy-3-sulpho-6-amino-naphthalene | methylamine | A | reddish-tinged orange |
| 69 | 2-amino-1,5-di-sulpho-naphthalene | 1-hydroxy-3-sulpho-6-amino-naphthalene | ethylamine | A | reddish-tinged orange |
| 70 | 2-amino-1,5-di-sulpho-naphthaline | 1-hydroxy-3-sulpho-6-amino-naphthalene | ethanolamine | B | reddish-tinged orange |
| 71 | 2-amino-1,5-di-sulpho-naphthalene | 1-hydroxy-3-sulpho-6-amino-naphthalene | diethanolamine | B | reddish-tinged orange |
| 72 | 2-amino-1,5-di-sulpho-naphthalene | 1-hydroxy-3-sulpho-6-amino-naphthalene | βmethoxyethylamine | B | reddish-tinged orange |
| 73 | 2-amino-1,5-di-sulpho-naphthalene | 1-hydroxy-3-sulpho-6-amino-naphthalene | morpholine | B | reddish-tinged orange |
| 74 | 2-amino-1,5-di-sulpho-naphthalene | 1-hydroxy-3-sulpho-6-amino-naphthalene | n-propylamine | B | reddish-tinged orange |
| 75 | 2-amino-1,5-di-sulpho-naphthalene | 1-hydroxy-3-sulpho-6-amino-naphthalene | isp-propylamine | B | reddish-tinged orange |
| 76 | 2-amino-1,5,7-tri-sulpho-naphthalene | 1-hydroxy-3-sulpho-6-amino-naphthalene | ammonia | A | orange |
| 77 | 2-amino-1,5,7-tri-sulpho-naphthalene | 1-hydroxy-3-sulpho-6-amino-naphthalene | methylamine | A | " |
| 78 | 2-amino-1,5,7-tri-sulpho-naphthalene | 1-hydroxy-3-sulpho-6-amino-naphthalene | ethylamine | B | " |
| 79 | 2-amino-1,5,7-tri-sulpho-naphthalene | 1-hydroxy-3-sulpho-6-amino-naphthalene | iso-propylamine | B | " |
| 80 | 2-amino-1,5,7-tri-sulpho-naphthalene | 1-hydroxy-3-sulpho-6-amino-naphthalene | cyclohexylamine | B | " |
| 81 | 2-amino-1,5,7-tri-sulpho-naphthalene | 1-hydroxy-3-sulpho-6-amino-naphthalene | benzylamine | B | " |
| 82 | 2-amino-3,6-di-sulpho-naphthalene | 1-hydroxy-3-sulpho-6-amino-naphthalene | ammonia | A | scarlet |
| 83 | 2-amino-3,6-di-sulpho-naphthalene | 1-hydroxy-3-sulpho-6-amino-naphthalene | methylamine | A | " |
| 84 | 2-amino-3,6-di-sulpho-naphthalene | 1-hydroxy-3-sulpho-6-amino-naphthalene | dimethylamine | A | " |
| 85 | 2-amino-3,6-di-sulpho-naphthalene | 1-hydroxy-3-sulpho-6-amino-naphthalene | ethanolamine | A | " |
| 86 | 2-amino-3,6-di-sulpho-naphthalene | 1-hydroxy-3-sulpho-d-amino-naphthalene | diethanolamine | B | " |
| 87 | 2-amino-3,6-di-sulpho-naphthalene | 1-hydroxy-3-sulpho-6-amino-naphthalene | ethylamine | A | " |
| 88 | 2-amino-3,6-di-sulpho-naphthalene | 1-hydroxy-3-sulpho-6-methylamino-naphthalene | ammonia | A | " |
| 89 | 2-amino-3,6-di-sulpho-naphthalene | 1-hydroxy-3-sulpho-6-methylamino-naphthalene | methylamine | A | " |
| 90 | 2-amino-3,6,8-trisulpho-naphthalene | 1-hydroxy-3-sulpho-6-amino-naphthalene | ammonia | A | " |
| 91 | 2-amino-3,6,8-trisulpho-naphthalene | 1-hydroxy-3-sulpho-6-amino-naphthalene | methylamine | A | " |
| 92 | 2-amino-3,6,8-trisulpho-naphthalene | 1-hydroxy-3-sulpho-6-amino-naphthalene | dimethylamine | A | " |
| 93 | 2-amino-3,6,8-trisulpho- | 1-hydroxy-3-sulpho-6-amino-naphthalene | ethylamine | A | " |

-continued

| Example | Column 1 | Column 2 | Column 3 | Variant | Column 4 |
|---|---|---|---|---|---|
| 94 | 2-amino-3,6,8-trisulpho-naphthalene | 1-hydroxy-3-sulpho-6-amino-naphthalene | diethylamine | B | " |
| 95 | 2-amino-3,6,8-trisulpho-naphthalene | 1-hydroxy-3-sulpho-6-amino-naphthalene | ethanolamine | B | " |
| 96 | 2-amino-3,6,8-trisulpho-naphthalene | 1-hydroxy-3-sulpho-6-amino-naphthalene | diethanolamine | B | " |
| 97 | 2-amino-3,6,8-trisulpho-naphthalene | 1-hydroxy-3-sulpho-6-amino-naphthalene | iso-propylamine | B | " |
| 98 | 2-amino-3,6,8-trisulpho-naphthalene | 1-hydroxy-3-sulpho-6-amino-naphthalene | n-propylamine | B | " |
| 99 | 1-amino-2-sulpho-4-acetylamino-benzene | 1-hydroxy-3-sulpho-6-amino-naphthalene | ammonia | A | bluish-tinged scarlet |
| 100 | 1-amino-2-sulpho-4-acetylamino-benzene | 1-hydroxy-3-sulpho-6-amino-naphthalene | methylamine | A | bluish-tinged scarlet |
| 101 | 1-amino-2-sulpho-4-acetylamino-benzene | 1-hydroxy-3-sulpho-6-amino-naphthalene | ethylamine | A | bluish-tinged scarlet |
| 102 | 1-amino-2-sulpho-4-acetylamino-benzene | 1-hydroxy-3-sulpho-6-amino-naphthalene | ethanolamine | B | bluish-tinged scarlet |
| 103 | 1-amino-2-sulpho-4-acetylamino-benzene | 1-hydroxy-3-sulpho-6-amino-naphthalene | diethanolamine | B | bluish-tinged scarlet |
| 104 | 1-amino-2-sulpho-4-acetylamino-benzene | 1-hydroxy-3-sulpho-6-amino-naphthalene | cyclohexylamine | B | bluish-tinged scarlet |
| 105 | 1-amino-2-sulpho-4-acetylamino-benzene | 1-hydroxy-3-sulpho-6-amino-naphthalene | morpholine | B | bluish-tinged scarlet |
| 106 | 1-amino-2-sulpho-4-(4'-sulphophenyl-azo)-benzene | 1-hydroxy-3-sulpho-6-amino-naphthalene | ammonia | A | yellowish-tinged red |
| 107 | 1-amino-2-sulpho-4-(4'-sulphophenyl-azo)-benzene | 1-hydroxy-3-sulpho-6-amino-naphthalene | methylamine | A | yellowish-tinged red |
| 108 | 1-amino-2-sulpho-4-(4'-sulphophenyl-azo)-benzene | 1-hydroxy-3-sulpho-6-amino-naphthalene | ethylamine | A | yellowish-tinged red |
| 109 | 1-amino-2-sulpho-4-(4'-sulphophenyl-azo)-benzene | 1-hydroxy-3-sulpho-6-amino-naphthalene | dimethylamine | A | yellowish-tinged red |
| 110 | 1-amino-2-sulpho-4-(4'-sulphophenyl-azo)benzene | 1-hydroxy-3-sulpho-6-amino-naphthalene | diethylamine | B | yellowish-tinged red |
| 111 | 1-amino-2-sulpho-4-(4'-sulphophenyl-azo)-benzene | 1-hydroxy-3-sulpho-6-amino-naphthalene | ethanolamine | B | yellowish-tinged red |
| 112 | 1-amino-2-sulpho-4-(4'-sulphophenyl-azo)-benzene | 1-hydroxy-3-sulpho-6-amino-naphthalene | morpholine | B | yellowish-tinged red |
| 113 | 1-amino-2-sulpho-4-(4'-sulphophenyl-azo)-benzene | 1-hydroxy-3-sulpho-6-amino-naphthalene | iso-propylamine | B | yellowish-tinged red |
| 114 | 1-amino-2,5-disulpho-4-methylbenzene | 1-hydroxy-3-sulpho-6-amino-naphthalene | ammonia | A | orange |
| 115 | 1-amino-2,5-disulpho-4-methylbenzene | 1-hydroxy-3-sulpho-6-amino-naphthalene | methylamine | | " |
| 116 | 1-amino-2,5-disulpho-4-methylbenzene | 1-hydroxy-3-sulpho-6-amino-naphthalene | dimethylamine | | " |
| 117 | 1-amino-2,5-disulpho-4-methylbenzene | 1-hydroxy-3-sulpho-6-amino-naphthalene | ethylamine | | " |
| 118 | 1-amino-2,5-disulpho-4-methylbenzene | 1-hydroxy-3-sulpho-6-amino-naphthalene | iso-propylamine | | " |
| 119 | 1-amino-2,5-disulpho-4-methyl-benzene | 1-hydroxy-3-sulpho-6-amino-naphthalene | cyclohexylamine | | orange |
| 120 | 1-amino-2,5-disulpho-4-methyl-benzene | 1-hydroxy-3-sulpho-6-amino-naphthalene | ethanolamine | | " |
| 121 | 1-amino-2,5-disulpho-4-acetyl-aminobenzene | 1-hydroxy-3-sulpho-6-amino-naphthalene | ammonia | | scarlet |
| 122 | 1-amino-2,5-di- | 1-hydroxy-3-sulpho- | methylamine | | " |

| Example | Column 1 | Column 2 | Column 3 | Variant | Column 4 |
| --- | --- | --- | --- | --- | --- |
| | sulpho-4-acetyl-aminobenzene | 6-amino-naphthalene | | | |
| 123 | 1-amino-2,5-di-sulpho-4-acetyl-aminobenzene | 1-hydroxy-3-sulpho-6-amino-naphthalene | ethylamine | | " |
| 124 | 1-amino-2,5-di sulpho-4-acetyl-aminobenzene | 1-hydroxy-3-sulpho-6-amino-naphthalene | ethanolamine | | " |
| 125 | 1-amino-2,5-di-sulpho-4-acetyl-aminobenzene | 1-hydroxy-3-sulpho-6-amino-naphthalene | cyclohexylamine | | " |
| 126 | 1-amino-2,5-di-sulpho-4-acetyl-aminobenzene | 1-hydroxy-3-sulpho-6-amino-naphthalene | iso-propylamine | | " |

EXAMPLE 127

50.3 g of the azo dyestuff 2,5-disulpho-benzene <1 azo 2> 1-hydroxy-3-sulpho-6-amino-naphthalene are dissolved in a mixture of 250 ml of water and 150 g of ice. 13.5 g of 5-trifluorotriazine are then added dropwise, and during this addition the pH value is kept between 3.5 and 4.5 by simultaneously adding 20% strength sodium carbonate solution. When the condensation reaction has ended, the mixture is further stirred for some minutes. 13.6 g of cyclohexylamine hydrochloride are added and the pH value is then adjusted to 9 with dilute sodium hydroxide solution. The mixture is stirred at pH 8.5–9 until no further sodium hydroxide solution is consumed. The temperature during the second condensation reaction is between 2 and 10°. The dyestuff is salted out, filtered off, dried and ground. It is identical to the product obtained according to Example 35.

We claim:
1. Dyestuffs of the formula

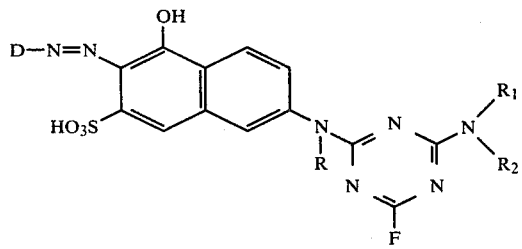

wherein

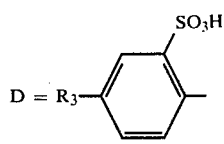

wherein
$R_3$ represents halogen selected from the group consisting of fluorine, chlorine and bromine; $C_1$-$C_4$-alkyl, $C_1$-$C_4$-alkoxy or a sulpho, carboxyl, acylamino or 4-sulphophenylazo group,
or wherein

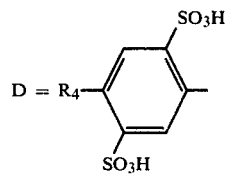

wherein
$R_4$ represents hydrogen, methyl, ethyl or acylamino,
or wherein

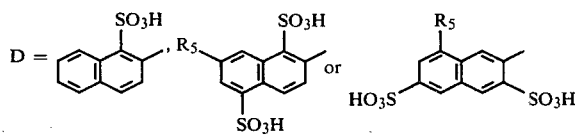

wherein
$R_5$ represents hydrogen or a sulpho group,
and wherein
R=hydrogen or $C_1$-$C_4$-alkyl and
$R_1$ and $R_2$=hydrogen, unsubstituted or substituted alkyl or cycloalkyl or
$R_1$ and $R_2$ form a ring with the nitrogen atom including a further hetero-atom.
2. Dyestuffs of the formula

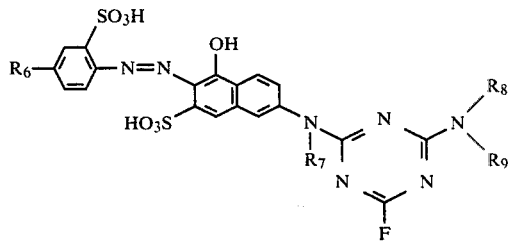

wherein
$R_6$=methyl, chlorine, acetylamino, sulpho, carboxyl, methoxy, ethoxy or 4-sulphophenylazo,
$R_7$=hydrogen or methyl,
$R_8$=hydrogen or $C_1$-$C_4$-alkyl and
$R_9$=hydrogen or $C_1$-$C_4$-alkyl.
3. Dyestuffs of the formula

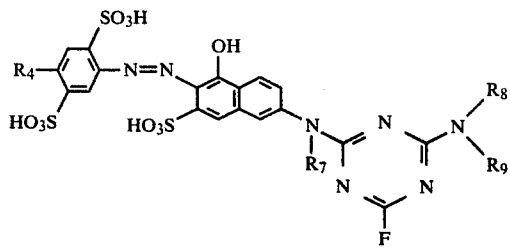

wherein
R$_7$, R$_8$ and R$_9$ have the meaning indicated in claim 2 and
R$_4$=hydrogen, methyl, ethyl or acetylamino.

4. Dyestuffs of the formula

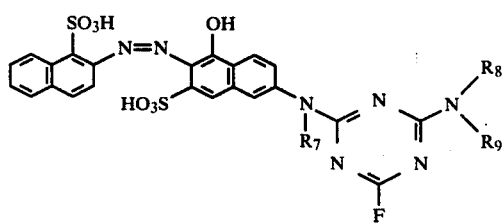

wherein
R$_7$, R$_8$ and R$_9$ have the meaning indicated in claim 2.

5. Dyestuff of the formula

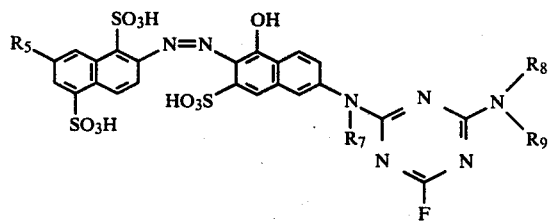

wherein
R$_5$ has the meaning indicated in claim 1 and
R$_7$=hydrogen or methyl,
R$_8$=hydrogen or C$_1$–C$_4$-alkyl and
R$_9$=hydrogen or C$_1$–C$_4$-alkyl.

6. Dyestuff of the formula

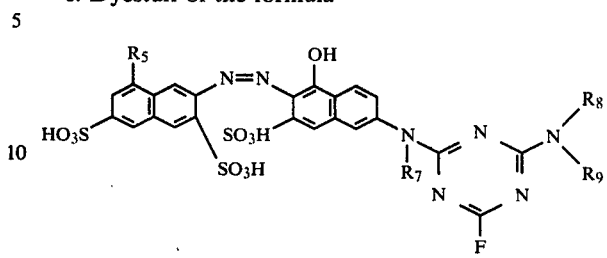

wherein
R$_5$ has the meaning indicated in claim 1 and
R$_7$=hydrogen or methyl,
R$_8$=hydrogen or C$_1$–C$_4$-alkyl and
R$_9$=hydrogen or C$_1$–C$_4$-alkyl.

7. Dyestuffs of the formula

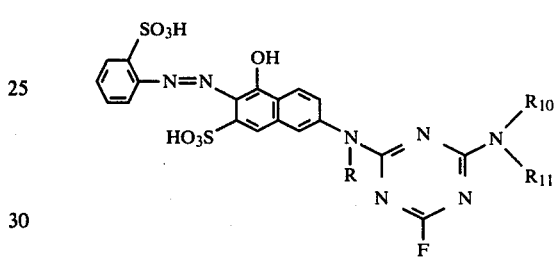

wherein
R has the meaning indicated in claim 1 and
R$_{10}$ and R$_{11}$=hydrogen, or unsubstituted or substituted C$_2$–C$_4$-alkyl, or
R$_{10}$ and R$_{11}$ form a ring with the nitrogen atom or R$_{10}$ and R$_{11}$ form a ring with the nitrogen atom and a further hetero-atom.

8. Dyestuffs of claim 1,
in which
R$_1$ and R$_2$=H, C$_1$–C$_4$-alkyl or C$_2$–C$_4$-hydroxyalkyl.

* * * * *

UNITED STATES PATENT AND TRADEMARK OFFICE
CERTIFICATE OF CORRECTION

PATENT NO. : 4,446,067
DATED : May 1, 1984
INVENTOR(S) : Horst Jager et al

It is certified that error appears in the above-identified patent and that said Letters Patent is hereby corrected as shown below:

Col. 1, line 22            Rightside of formula delete " $/SO_3E$ "

and substitute -- $/SO_3H$ --

Col. 11, Under Column 3", Insert -- - -- between "$\beta$" and
   Example 72                  "methoxyethylamine"

Col. 13, under "Column 1", Delete "aze" and substitute --azo--
   Example 111, 3rd line

Signed and Sealed this

*Nineteenth* Day of *March 1985*

[SEAL]

*Attest:*

DONALD J. QUIGG

*Attesting Officer*      *Acting Commissioner of Patents and Trademarks*